United States Patent
Gray et al.

(10) Patent No.: US 9,256,795 B1
(45) Date of Patent: Feb. 9, 2016

(54) TEXT ENTITY RECOGNITION

(71) Applicant: A9.com, Inc., Palo Alto, CA (US)

(72) Inventors: Douglas Ryan Gray, Mountain View, CA (US); Xiaofan Lin, Palo Alto, CA (US); Arnab Sanat Kumar Dhua, Mountain View, CA (US); Yu Lou, Stanford, CA (US)

(73) Assignee: A9.com, Inc., Palo Alto, CA (US)

( * ) Notice: Subject to any disclaimer, the term of this patent is extended or adjusted under 35 U.S.C. 154(b) by 288 days.

(21) Appl. No.: 13/842,433

(22) Filed: Mar. 15, 2013

(51) Int. Cl.
*G06K 9/20* (2006.01)

(52) U.S. Cl.
CPC .................................... *G06K 9/2054* (2013.01)

(58) Field of Classification Search
None
See application file for complete search history.

(56) References Cited

U.S. PATENT DOCUMENTS

| | | | |
|---|---|---|---|
| 4,876,457 A | 10/1989 | Bose | |
| 5,717,781 A | 2/1998 | Ebel et al. | |
| 6,731,788 B1 * | 5/2004 | Agnihotri et al. | 382/157 |
| 6,941,016 B1 | 9/2005 | Wagman et al. | |
| 7,003,161 B2 | 2/2006 | Tessadro | |
| 7,137,072 B2 | 11/2006 | Bauer et al. | |
| 7,587,308 B2 | 9/2009 | Kasravi et al. | |
| 7,996,571 B2 | 8/2011 | Salokannel | |
| 8,249,347 B1 | 8/2012 | Ramkumar et al. | |
| 8,290,215 B2 | 10/2012 | Nielsen et al. | |
| 8,582,727 B2 | 11/2013 | Saylor et al. | |
| 8,644,610 B1 | 2/2014 | Ramkumar et al. | |
| 8,654,934 B2 | 2/2014 | Saylor et al. | |
| 8,930,134 B2 | 1/2015 | Gu et al. | |
| 2003/0225686 A1 * | 12/2003 | Mollett et al. | 705/38 |
| 2005/0229200 A1 | 10/2005 | Kirkland et al. | |
| 2007/0233579 A1 | 10/2007 | Saarinen et al. | |
| 2010/0007601 A1 | 1/2010 | Lashina et al. | |
| 2010/0042523 A1 * | 2/2010 | Henry et al. | 705/34 |
| 2012/0005046 A1 | 1/2012 | Wu et al. | |
| 2012/0019557 A1 | 1/2012 | Aronsson et al. | |
| 2012/0190385 A1 | 7/2012 | Nair et al. | |
| 2012/0242842 A1 | 9/2012 | Yoshigahara et al. | |
| 2013/0045751 A1 | 2/2013 | Chao et al. | |
| 2013/0054576 A1 | 2/2013 | Karmarkar et al. | |
| 2013/0322754 A1 | 12/2013 | Lee et al. | |
| 2013/0330003 A1 * | 12/2013 | Ivanchenko et al. | 382/176 |

(Continued)

FOREIGN PATENT DOCUMENTS

WO     2013/184726      12/2013

OTHER PUBLICATIONS

PCT International Search Report and Written Opinion dated Jan. 31, 2014, for International Application No. PCT/US2013/044182, 7 pages.

(Continued)

*Primary Examiner* — Nirav G Patel
(74) *Attorney, Agent, or Firm* — Hogan Lovells US LLP

(57) ABSTRACT

Various embodiments enable the identification of semi-structured text entities in an imager. The identification of the text entities is a relatively simple problem when the text is stored in a computer and free of errors, but much more challenging if the source is the output of an optical character recognition (OCR) engine from a natural scene image. Accordingly, output from an OCR engine is analyzed to isolate a character string indicative of a text entity. Each character of the string is then assigned to a character class to produce a character class string and the text entity of the string is identified based in part on a pattern of the character class string.

18 Claims, 9 Drawing Sheets

(56) References Cited

U.S. PATENT DOCUMENTS

2014/0100997 A1 4/2014 Mayerle et al.
2015/0161715 A1 6/2015 Rose

OTHER PUBLICATIONS

USPTO Notice of Allowance mailed Jul. 29, 2013; in corresponding U.S. Appl. No. 13/491,398, 10 pages.

PCT International Preliminary Report on Patentability dated Dec. 9, 2014, for International Application No. PCT/US2013/044182, 5 pages.

USPTO Notice of Allowance mailed Feb. 20, 2015, for U.S. Appl. No. 14/046,814, 8 pages.

USPTO Final Office Action mailed Oct. 22, 2014, for U.S. Appl. No. 14/046,814, 7 pages.

USPTO Non-Final Office Action mailed Apr. 10, 2014, for U.S. Appl. No. 14/046,814, 5 pages.

USPTO Non-Final Office Action dated Mar. 27, 2015 for U.S. Appl. No. 13/750,940.

USPTO Non-Final Office Action dated Jul. 2, 2015 for U.S. Appl. No. 14/094,655.

* cited by examiner

FIG. 4A
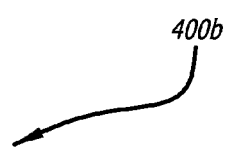
FIG. 4B

TEXT ENTITY RECOGNITION

BACKGROUND

As people utilize a variety of computing devices it can be advantageous to adapt to the ways in which people interact with these devices. For example, users are accustomed to manually inputting phone numbers to make a phone call, manually typing an email address to send an email, and manually typing a web address into a web browser to view a web page. However, these tasks are often tedious and time consuming. As such, a variety of methods to save users time have been offered on these devices, such as assigning a phone number to a favorites list and bookmarking a Web address. As technology evolves and as the features and services offered on computing devices expand, the way in which shortcuts and other time saving methods are provided is changing.

BRIEF DESCRIPTION OF THE DRAWINGS

Various embodiments in accordance with the present disclosure will be described with reference to the drawings, in which:

FIGS. 4A and 4B illustrate two examples of a confusion matrix that can be used in accordance with at least one embodiment;

DETAILED DESCRIPTION

Figure 1A:
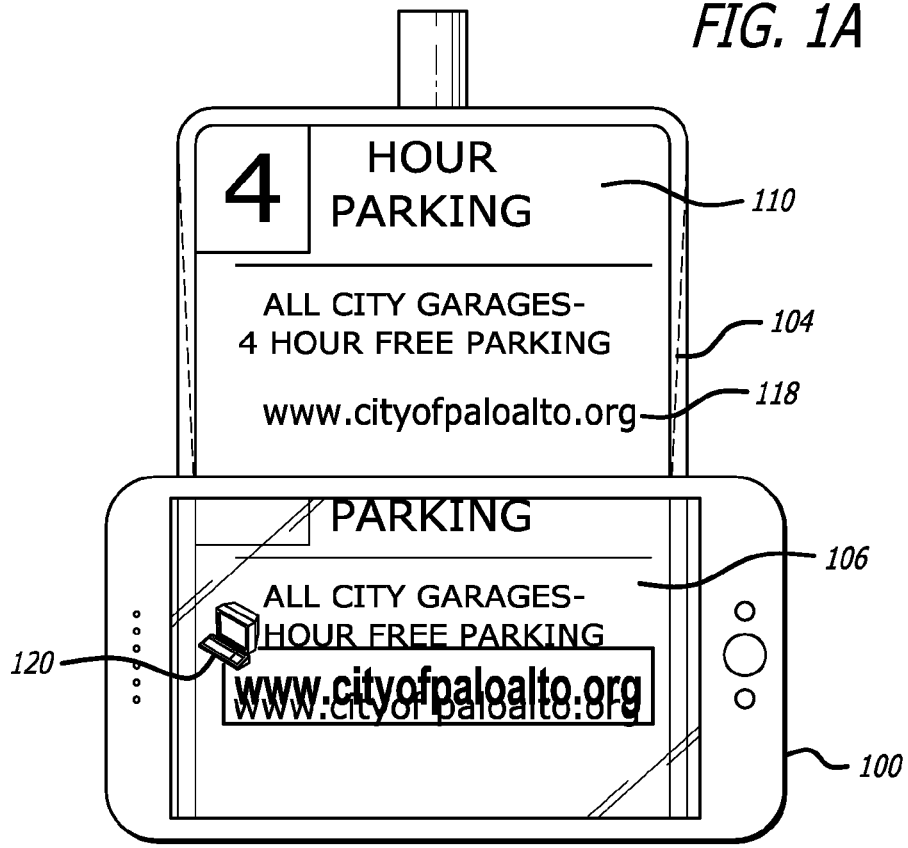
FIGS. 1A and 1B illustrate an example overlay provided in a live field of view of a camera based on a detected web address, in accordance with at least one embodiment.

Systems and methods in accordance with various embodiments of the present disclosure may overcome one or more of the foregoing or other deficiencies experienced in conventional approaches for providing input to an electronic device. In particular, various embodiments enable a device, such as a portable computing device, to perform tasks such as processing an image to recognize and locate text in the image, identifying a text entity type (e.g., an email, phone number, URL, etc.) from the recognized text, providing an overlay on the image that corresponds to a function (e.g., calling a number, opening an internet browser, etc.) associated with the recognized text, and performing the function associated with the text when the overlay (or another such option or element) is selected.

Printed text is ubiquitous and is one of the easiest ways of exchanging information. One form of text includes semi-structured entities which encode some identity information about a particular class of entity. For example, phone numbers contain a series of digits which identify an endpoint in a communications network. Semi-structured entities contain some common structure consisting of length, spacing, punctuation or grouping of certain classes of characters which can be used to identify the class of entity without an explicit label. Phone numbers, for example, include three groups of digits of length three, three and four, delimitated by dashes. This is a common pattern which indicates the numbers correspond to a phone numbers as opposed to an Internet Protocol (IP) address, for example, which includes four sets of numbers between 0 and 255 by dots (e.g. 202-555-1234 is a phone number, whereas 202.55.51.234 is likely an IP address).

Text provided in a digital format can be identified by a computing device with a fairly high degree of precision using various pattern matching approaches. The problem becomes more challenging when the text entity in question is painted on a signboard several feet away from a computing device. To a human this is a trivial problem, yet solving it (e.g. reading the sign and typing the numbers into a phone) is an inconvenience that could be handled by the computing device. Solving this problem of identifying semi-structured entities in real world images requires the ability to identify and read text in images, which is not a trivial problem and such systems are typically prone to errors. The method described herein, therefore, is designed to be resilient to various kinds of errors. For example, if the OCR engine returns a string such as "call: 65o-555-1123 or visit hello.c0m", the system will return "Phone: (650)555-1234, Url: hello.com".

In accordance with various embodiments, an overlay can be rendered on an interface displaying the active field of view of a camera. The interface can display to a user an image or video, for example, and the overlay can be rendered over, near, or otherwise positioned with respect to any text or other such elements represented in the image. The overlay can have associated therewith at least one function or information, and when an input associated with the overlay is selected, the function can be performed (or caused to be performed) by the portable computing device. For example, at least one camera might be integrated into the portable computing device, and the device can display an image that is currently being captured by the camera. The image can be processed to recognize text in the image, and a text entity type (e.g., a phone number, a URL, etc.) can be determined from the recognized text.

In at least one embodiment, processing the image to recognize text therein includes recognizing text within the image with an optical character recognition (OCR) engine. The output on the OCR engine can undergo a number of heuristic tests to filter out text portions that are not indicative of a target text entity type (e.g., a phone number, a URL, etc.). For phone numbers, any string of length less than seven or without at least three digit characters is omitted. For Uniform Resource Locators (URLs), at least four characters and at least one period are required to pass the URL text. For email addresses, at least six characters are required and both an '@' sign and a period are required to past the email text. Each character of strings of the OCR output that meet at least one of these criterion are assigned to a character class to produce a character class string (e.g. for a phone number, ddd-ddd-dddd, where d represents any digit). Based at least in part on a pattern of the character class string, a matching score is determined. If the matching score is greater than a threshold score, the character string is identified as being at least one of a phone number, an email address, a URL, a street address, or the like text entity types. The text entity type can be associated with an overlay that performs a function when selected, and the overlay can be rendered on the interface at the location corresponding to the text. When an input associated with the overlay is selected, the function associated with the overlay can be performed by the portable computing device.

For example, a user can view an advertisement using their portable mobile device, the advertisement having displayed thereon a phone number, a barcode of an advertised product, and a web address of the advertised product. When the user views the advertisement on the interface of the portable computing device, an overlay can be displayed above each area of recognized text in the advertisement. The overlay can be selected, and when selected, can cause the portable computing device to perform a function. For example, the overlay above the phone number, when selected, can be used to make a call to the phone number displayed in the advertisement. Additionally or alternatively, selecting the overlay above the phone number can be used to store the phone number in the user's portable mobile device. The overlay above the barcode, when selected, can be used to open a web browser or other application to look up the product identified by the barcode. The overlay above the web address, when selected, can open a web browser at the web address displayed in the advertisement.

Various other functions and advantages are described and suggested below as may be provided in accordance with the various embodiments.

Figure 1B:
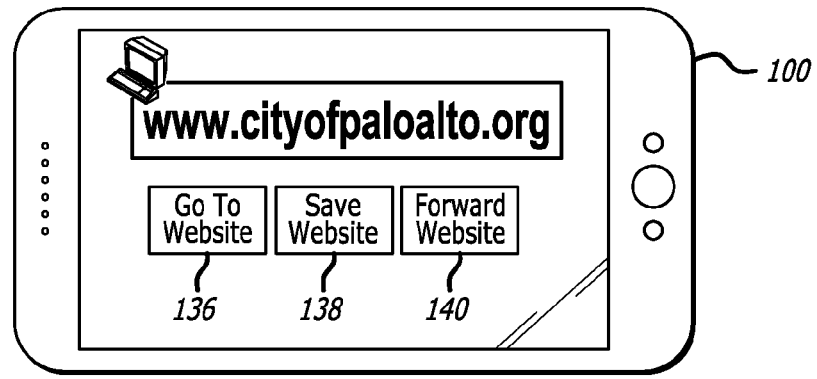

FIGS. 1A-1B illustrate an example implementation where a user holding a portable computing device is provided an overlay in a live field of view of a camera based on a detected URL, in accordance with an embodiment. As shown in FIG. 1A, the user is pointing the portable computing device 100 at a street sign 110. The portable computing device 100, in accordance with various embodiments, includes a camera and an interface 106 that displays an image captured in an active field of view 104 of the camera. The street sign 110 has displayed thereon a website URL 118, and the user may want to access the website from their portable computing device 100. When the user points the camera of the portable computing device 100 at the street sign, the image of the street sign will be processed as described elsewhere herein (i.e., a text entity type is determined). The text entity type is associated with a text entity type overlay, and the text entity type overlay is rendered on the interface of the portable computing device 100. The text entity type overlay can be represented as a computer icon 120, and can include the website URL displayed on the street sign.

In one example, tapping/selecting the computer icon 120 can open a web browser that navigates the user to the displayed website URL. Alternatively, tapping/selecting the computer icon 120 can provide options to the user on how to proceed. For example, as shown in FIG. 1B, selecting computer icon 120 can launch an application that includes options to navigate to the website 136, save the website as a bookmark 138, and share the website 140.

Figure 2:
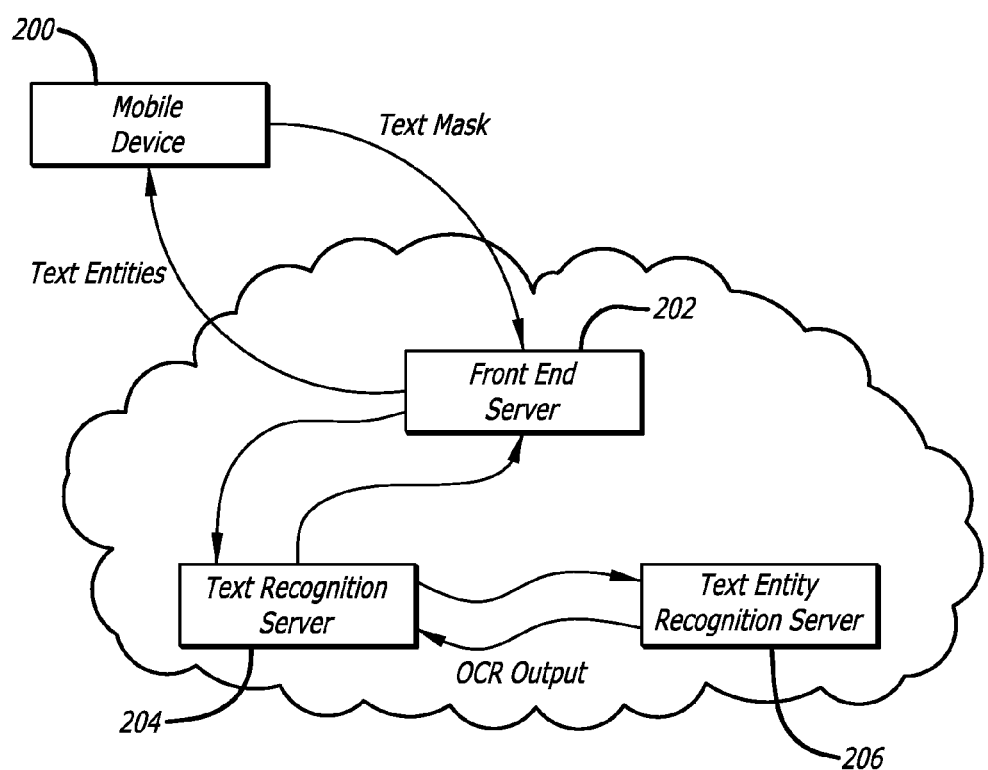
FIG. 2 illustrates an example network system block diagram in accordance with at least one embodiment.

FIG. 2 illustrates a high level work flow of a system for identifying text entity types, in accordance with various embodiments. In this example, a processing component of a mobile computing device 200 can implement algorithms that detect and recognize the location of text in the image, and the region of the image that includes the text can be cropped to create a region of cropped text. The region of cropped text can be binarized. Thereafter, the region of binarized text or text mask can be, in one example, compressed into a PNG file and communicated to a front end server 202. Alternatively, in accordance with an embodiment, a grey scale image, color image or any other image (cropped or otherwise not cropped) can be communicated to the front end server 202 (or remain on the portable computing device) for further processing. In this example, the front end server 202 passes the image to a text recognition server 204 where text in the image is recognized.

In accordance with various embodiments, the mobile computing device 200 or the front end server 202 can detect text in the image. Detecting text includes locating regions of extremes (e.g., regions of sharp transitions between pixel values) such as the edges of letters. The regions of extremes, or the maximally stable extremal regions, can be extracted and analyzed to detect characters, where the detected characters can be connected and aggregated. A text line algorithm can be used to determine the orientation of the connected characters, and once the orientation of the characters is determined, a binary mask of the region containing the characters can be extracted. The binary mask can be converted into a black white representation, and the black white representation communicated to the text recognition server 204 for further processing. The OCR output from the text recognition server 204 is then passed to a Text Entity Recognition Service (TERS) server 206 which returns any identified text entities back to the mobile computing device 200.

If the text in question can be read without errors from the OCR engine, then there are a number of simple approaches that can be used to determine the text entity type. In one example, such an approach includes regular expression pattern matching. A string of characters can be defined to match a pattern which can vary in a few different ways. For example, a phone number can be represented as: "((\(\d{3}\))|(\d{3}-))\ d{3}-\d{4}"; a URL: "([\d\w-.]+?\.(us, biz, com, edu, gov, mil, net, org, etc.)(\b|\W(?<!&|=)(?!\.\s|\.{3}).*?))(\s|$)"; and an email can be represented as: "[\d\w-.]+@([\d\w-.]+?\.(us, biz, com, edu, gov, mil, net, org, etc.))". These patterns work very well for uncorrupted text, and can even be modified to handle some common errors, but that resiliency to errors comes at a significant cost to the complexity of the patterns and therefore to their runtime and maintainability.

Figure 3:
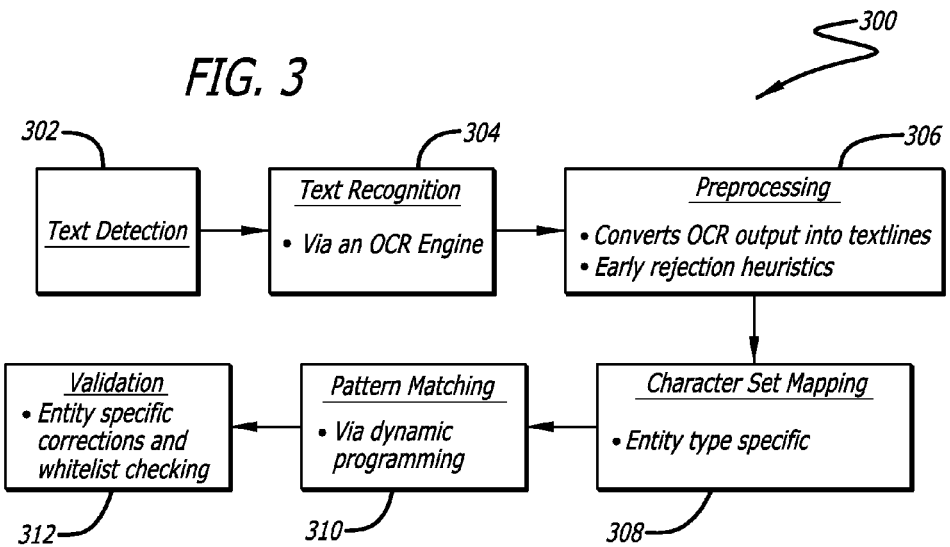
FIG. 3 illustrates an example process block diagram in accordance with at least one embodiment.

FIG. 3 provides a flow diagram illustrating a process 300 for recognizing text entity types, in accordance with at least one embodiment. Portions of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

As indicated at block 302, the process 300 generally begins by detecting text in an image. Detecting text in an image can include more or fewer steps as described elsewhere herein. In one example, text detection can include performing glyph detection on the captured image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a text mask which can include any punctuation that may have been filtered out earlier due to a minimum size constraint that can be imposed thereon. Accordingly, the region of binarized text or text mask can be, in one example, compressed into a PNG file and communicated to a front end server 202. In this example, as indicated at block 304, the detected text is sent to the text recognition server 204 to recognize text with an OCR engine. In at least one embodiment, raw output from the OCR engine is taken as input by the TERS server 206 and a list of semi-structured entities is returned.

In accordance with at least one embodiment, glyph detection can further include extracting the maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

In one example, character classification may further include extracting features from each MSER, the features including: Bounding Box Aspect Ratio (width over height); Compactness (4 pi times area over perimeter squared); Raw Compactness (4 pi times number of pixels over perimeter squared); Stroke Width (estimated using distance transform) divided by width; Stroke Width (estimated using distance transform) divided by height; Solidity (area over bounding box area); Convexity (convex hull perimeter over perimeter); Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate.

In accordance with an embodiment, pair finding can further include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity. Word line finding, in accordance with at least one embodiment, can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

In accordance with an embodiment, base line estimation may additionally include estimating the slope of the baseline using a clustering algorithm, then computing intercepts that minimize the minimum distance between baselines and glyphs. Each word candidate can have at least two lines in the top and bottom points of the glyphs, and if two or more words appear to have the same baselines, they can be merged and the lines can be reestimated. Further, in accordance with an embodiment, glyph refinement can be performed after baseline estimation is performed, where all glyphs that are classified as non-text, but fit into the baseline configuration, are included. Word splitting can further include estimating the spaces between glyphs in each baseline and choosing a threshold, where any gap between characters greater than that threshold can be considered to be a word boundary (space) and can be marked as such. Further, binarization may include binarizing each region in the bounding box based at least in part on the threshold used to compute the regions character and the regions character's neighbors.

The output of the OCR engine at block 304 comprises one or more text lines assumed to be a collection of words, grouped by line, in one example. If the collection of words is not grouped in one or more lines, a word line aggregation process can be performed. Each word in the text line is processed separately. Each line is then processed into a simple string with a space inserted between each word. For each string, a cascade of heuristic operations/tests can be performed in a preprocessing step at block 306. For example, any string of length less than seven is automatically determined not to be a phone number. A string must have at least four characters and at least one period to qualify as a URL candidate and, in order to qualify as an email candidate, a string must have both an '@' sign and a period. These simple tests can save time on images which contain no text entities, but generally do not have any effect on images which do contain one or more text entities. Therefore, the one or more text lines are analyzed to isolate strings indicative of a phone number, an email address, or a URL. In general, these tests are included purely for speed and efficiency reasons and do not have any significant effect on accuracy.

As indicated at block 308, the process 300 performs a character set mapping operation of the candidate by assigning each character of the isolated strings to a character class to produce a character class string. In at least one embodiment, the isolated strings, that comprise multiple different characters (e.g., a, b, c, 1, 2, 3, etc.), are translated into a character class representation. For example, all phone numbers ASCII characters are mapped to one of eight character classes which include a digits class (e.g., 1, 2, 3 . . . ), open and close parenthesis class, dash/dot class (e.g., '.' and '-'), space class, and an upper and lower case letters classes, and an other characters class. Eleven classes including a upper and lower case letters classes, digits class, period, dash, space, slash, '@' sign, colon, tilde, and then a class for the remainder of characters not a part of one of the aforementioned classes are used for URLs and email addresses. Assigning each character of the strings to a character class allows for a pattern, such as ddd-ddd-dddd to match 203-555-1234 and 480-444-4321, as well as the other 10 billion possible phone numbers that can be written with the same pattern.

As indicated at block 310, the process 300 runs a pattern matching algorithm analyzes the pattern of the character string to determine whether it is a phone number, an email address, or a URL. Since it is desirable that a system, in accordance with variance, be resilient to common OCR errors, such as recognizing an '8' as a 'B' or incorrectly dropping a space between two characters, costs are assigned to various edits made to a string based on the classes of the individual characters. For simple substitutions a confusion matrix can be utilized which assigns small cost to confusing characters which look similar. For example, the cost of confusing a lowercase '!' with the digit '1' can be assigned a relatively small cost [0.1], whereas the cost of confusing an uppercase 'C' with the digit '2' will be large [0.8] since, in actuality, they are very different. FIGS. 4A and 4B illustrate two examples of such confusion matrices that can used in accordance various embodiments. In this example, FIG. 4A illustrates an N by N matrix 400*a* that represents replacement costs for N possible ASCII characters. However, since the patterns of the character strings consist of character classes instead of the characters themselves, a restricted asymmetric confusion matrix is used that is derived from the confusion matrix (N by N matrix for N possible ASCII characters). For example, if there are M possible character classes, then the N by N confusion matrix will be reduced to an N by M entity string confusion matrix 400*b*, as illustrated in FIG. 4B, that contains the cost of matching a recognized ASCII character from the OCR engine to a character class. For example the cost of matching a digit '1' to the digit class will be zero, but the cost of matching the digit '1' to an lowercase '1' might be 0.1 because it is similar, but part of the lowercase letter class.

The confusion matrix can be either estimated from the error rate of the OCR engine, or defined manually by a human. An insertion and deletion cost are additionally defined for each character class separately and different sets of costs for modifying the input string and the pattern string are maintained. These costs have been fine tuned to satisfy a number of constraints on the entity types and the likelihood of the OCR errors that would necessitate them. For example, the cost of inserting characters into a URL pattern string is relatively small, which allows a simple pattern such as "cc.cc" to match longer strings such as "cccccc.ccc". Conversely, the cost of inserting or deleting a digit character from a phone number pattern is relatively high, since there must be a certain number of digits in a phone number.

Figure 5:
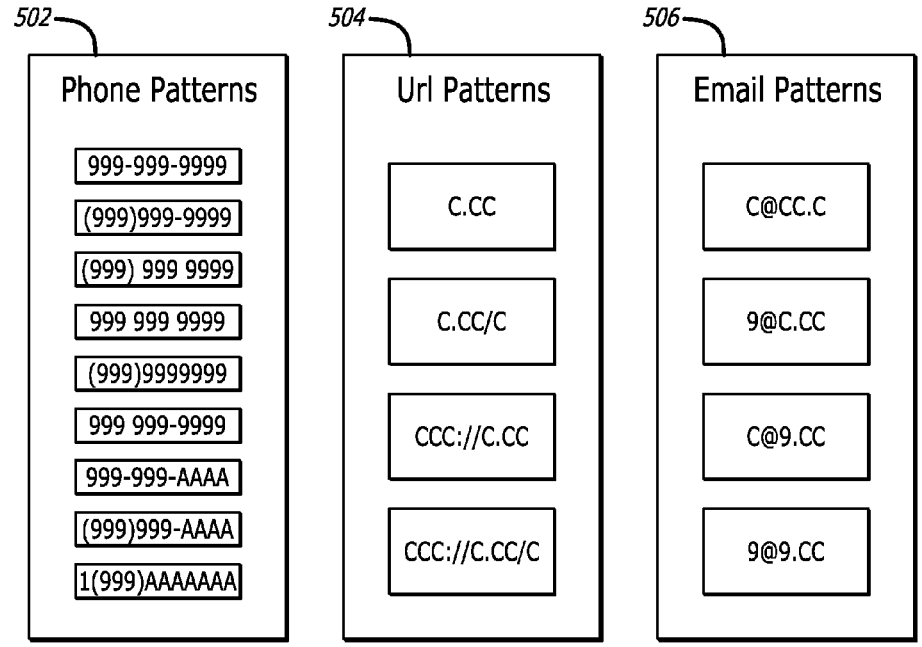
FIG. 5 illustrates examples of entity string patterns in accordance with at least one embodiment.

To recognize a text entity from the character string, a variation of an edit distance calculation is used to find the longest pattern match from the character strings to a set of pattern strings 500 of FIG. 5, which represents some, but not necessarily all possible pattern strings. In this example, a phone number pattern list 502 represents a number of possible U.S. phone number patterns where '9' represents all possible digits and A represents all possible uppercase digits that refer to numbers on a phone keypad. URL pattern list 504 represents a number of possible URL patterns where the 'C' represents all possible alpha-numeric (and possibly other) characters. Email patterns list 506 represents a number of possible email patterns where the 'C' represents all possible alphabetic characters and '9' represents all possible digits and A represents all possible uppercase digits. Other possible patterns are also possible in other representations. Although only phone numbers, URLs, and emails are represented, a system in accordance with various embodiments could also identify other types of text entities. For example, mailing addresses, stock tickers, product model numbers, ISBN, PLU codes, and the like can also be recognized.

In one embodiment, the algorithm can be an application of dynamic programming for finding the longest common substring. The main difference is that the cost value is transformed into a score and the algorithm tries to find the maximum score, instead of the minimum cost. Since the algorithm will always return some result, a threshold of the results is taken based on a threshold that depends on the length of the pattern string. For example, the phone number pattern "ddd-ddd-dddd" has length 12, so any result with score less than 12−0.5=11.5 might be rejected. This would allow several digits to be misread as similar looking characters, but would not allow any characters to be dropped or added.

Since the matching algorithm may match a recognized character to one outside it's character class, knowing the entity type can be used to correct that character to one that matches the pattern class. The intuition here is that while the OCR engine may have thought that the recognized character was the most likely at the time, it had no information about the statistics or structure of the entity type. Thus P[character | detected entity] may be different than P[character] alone. There is a slight problem here, in that there is some ambiguity as to which character to autocorrect a mistake to. For example, if a character is detected as a digit '1' but matched to a character class, there is no easy way to tell if it should be an uppercase 'I' or a lowercase 'l'. Attempts can be made to intelligently replace such characters by minimizing the cost, but there is always some ambiguity and cases where a guess must be made.

As indicated at block 312, the process 300 performs entity specific character corrections and entity whitelist checking. Often times there are entity specific constraints that can be used to either reject false positives or assist in autocorrecting bad results to more likely ones. For example, the first digit of a phone number must be 1, for a US number, and that the next three digits represent the area code. Since there are only around 400 valid area codes, we can reject any number that is not in a whitelist of valid codes. For URLs and email addresses, the confusion matrix discussed above can be used alone with various edit distance methods to look for relatively close matches in a whitelist of the top known websites on the internet, for example. Similarly, a list of valid top level domain names can be cross-referenced to reject any emails which do not contain one of these strings to within a certain edit distance. For example, an edit distance algorithm could be used to correct bob@maii.com to bob@mail.com.

Further, text entities may overlap, but not be completely subsumed by one another. If one entity is a substring of another, the smaller of the two will be rejected. This prevents email addresses from being detected as URLs, for example, since the latter half of an email address is, by definition, a valid URL. There are some valid cases where text entities may overlap. For example, 1-800-CONTACTS.COM®, for example, is both a website and a phone number, and both should be recognized and returned as such.

Accordingly, after the entity type has been identified, the text entity type (e.g., an email, phone number, URL, etc.) from the recognized text, can be provided as an overlay on the image that corresponds to a function (e.g., calling a number, opening an internet browser, etc.) associated with the recognized text, and performing the function associated with the text when the overlay (or another such option or element) is selected. The text entity type overlay can graphically display to a user a possible action/functionality that can be executed by tapping/selecting the text entity type overlay. For example, the text entity type overlay can be represented as a phone icon, and tapping/selecting the phone icon can be used to call the number associated with the text entity type overlay. The text entity type overlay can be based on an overlay template. The overlay template can be used as an overlay element to display on the interface, over a current view being captured by the camera, at least a portion of the textual content (e.g., a portion or all of a phone number) at a location over, near, or otherwise positioned with respect to the location of the recognized text. The overlay element can include at least one user-selectable element that enables the functionality associated with the text entity type to be performed with respect to the textual content. When an interaction with at least one user-selectable element of the overlay is detected, the functionality associated with the text entity type can be performed by the portable computing device or another component situated on the device. Additionally or alternatively, an application associated with the text entity type can also be associated with at least one user-selectable element of the overlay, and when the at least one user-selectable element is selected, the portable computing device can instantiate an instance of the application. Thereafter, the application can automatically be provided with the textual content corresponding to the text entity type, and the textual content can be used by the application to e.g., be inputted into a search engine or other application.

Figure 6:
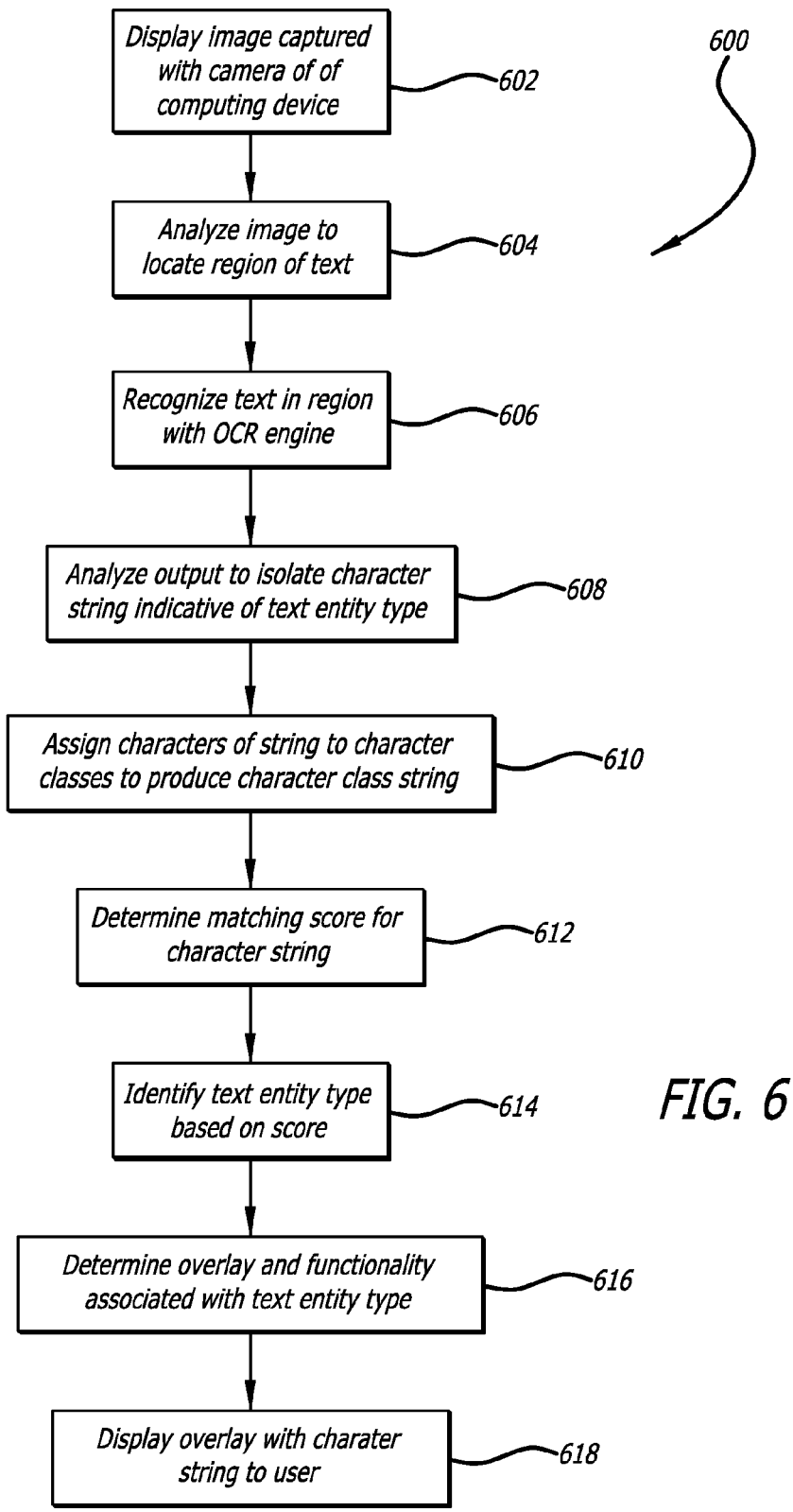
FIG. 6 illustrates an example process for extracting text entities from natural scenes that can be used in accordance with at least one embodiment.

FIG. 6 illustrates an example process 600 for recognizing text in an image with a computing device that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image captured by a camera of a computing device is obtained and displayed on a display screen 602. The image is analyzed to locate a region of text, as described in detail elsewhere herein 604. In this example, the text within the image is then recognized with an OCR engine 606. The output of recognized text, in one example, includes a bunch of textual characters grouped together by one or more text lines. In this example, the one or more text lines are analyzed to isolate one or more character strings indicative of a phone number, an email address, or URL 608. Each character of the isolated character string is then assigned (or mapped) to a character class to produce a character class string 610. A matching score for the isolated character string is determined for how closely it matches a pattern of a phone number, an email address, or a URL 612. In this example, if the matching score is greater than a threshold score, the character string is identified as being a phone number, an email address, or a URL, depending on the pattern 614. Once the entity type is identified, an overlay template and respective functionality for the identified entity is determined 616. Accordingly, the character string is displayed on a display element using the overlay template as an overlay element in a live field of view being captured by the camera 618. In one example, the overlay element includes a user-selectable element enabling the respective functionality associated to be performed. Various other approaches can be used as well as discussed or suggested elsewhere herein.

In at least one embodiment, instead of providing a single output from the OCR engine for entity recognition, multiple outputs can also be provided. In one example, multiple image frames can be processed by the OCR engine or the OCR engine may provide multiple outputs for a single frame. Accordingly, if multiple outputs of the same string of text have a matching score greater than the threshold score, the output with the score can be selected for display to the user.

Further, the text entity recognition method described herein with respect to process 600 could also be used alongside the regular expression method described above. For example, a string of text could initially be processed using the regular expression method followed by a technique in accordance with process 600 or similar thereto within the scope of various embodiments discussed herein. However, since it is more for effective for uncorrupted text, the regular expression method could also be used after, to double check a technique in accordance with process 600. Accordingly, the regular expression method could be used in parallel to a technique in accordance with process 600 and the final results of each can be compared. Various other approaches can be used as well as discussed or suggested elsewhere herein.

Figure 7:
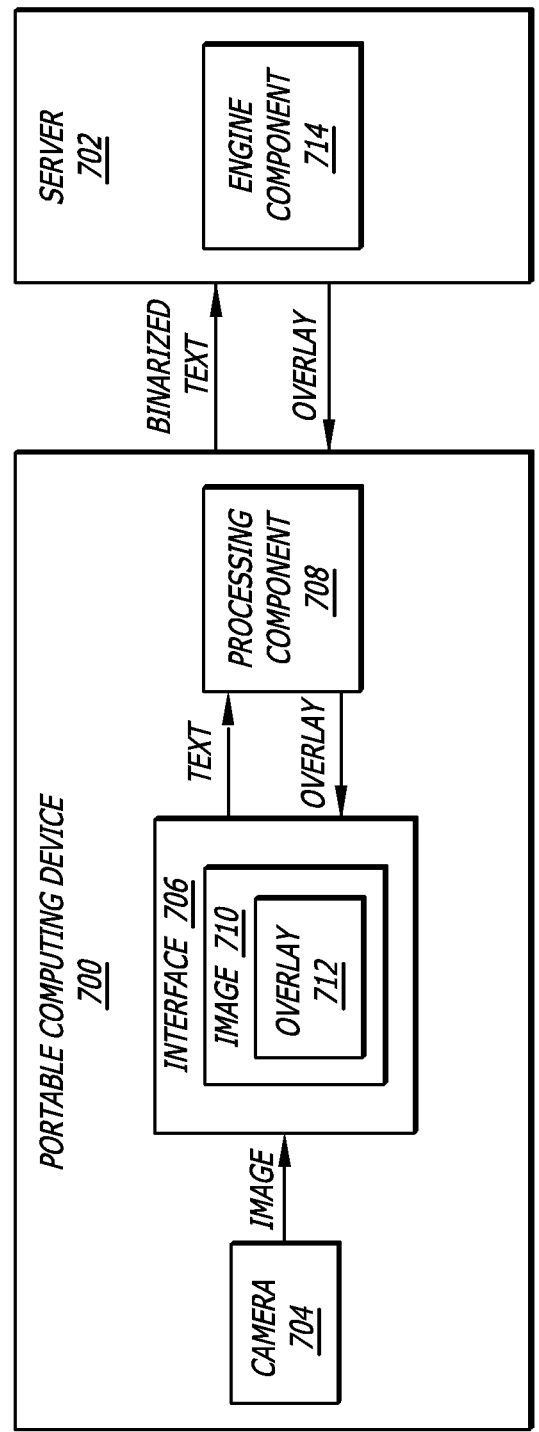
FIG. 7 illustrates an example system for providing overlays based on a detected image in a live field of view of a camera, in accordance with at least one embodiment.

FIG. 7 illustrates an example system for providing augmented reality overlays based on a detected image in a live field of view of a camera, in accordance with an embodiment. As shown in FIG. 7, a portable computing device 700 is in communication with a server 702. The portable computing can device can be a mobile phone or any computing device that can be operated by a user. The server can be any type of server such as an application server, a web server, etc.

The portable computing device in this example includes a camera 704, an interface 706 (e.g., a display element) that displays the field of view of the camera, and a processing component 708. The camera can include a lens and an image sensor that converts an optical image into an electrical signal. The portable computing device can be aimed in different directions and the interface can display an image 710 of the current/active field of view being captured by the camera. It should be noted that the image is not a snapshot of the current/active field of view being captured by the camera; rather, the image is the current (or live) rendering of what the camera is being pointed at.

The processing component processes the image in the active field of view of the camera to detect text in the image. For example, the processing component can implement algorithms that detect and recognize the location of text in the image, and the region of the image that includes the text can be cropped to create a region of cropped text. The region of cropped text can be binarized. Thereafter, the region of binarized text is communicated to the server. Alternatively, in accordance with an embodiment, a grey scale image, color image or any other image (cropped or otherwise not cropped) can be communicated to the server (or remain on the portable computing device) for further processing.

Figures 8A, 8B:
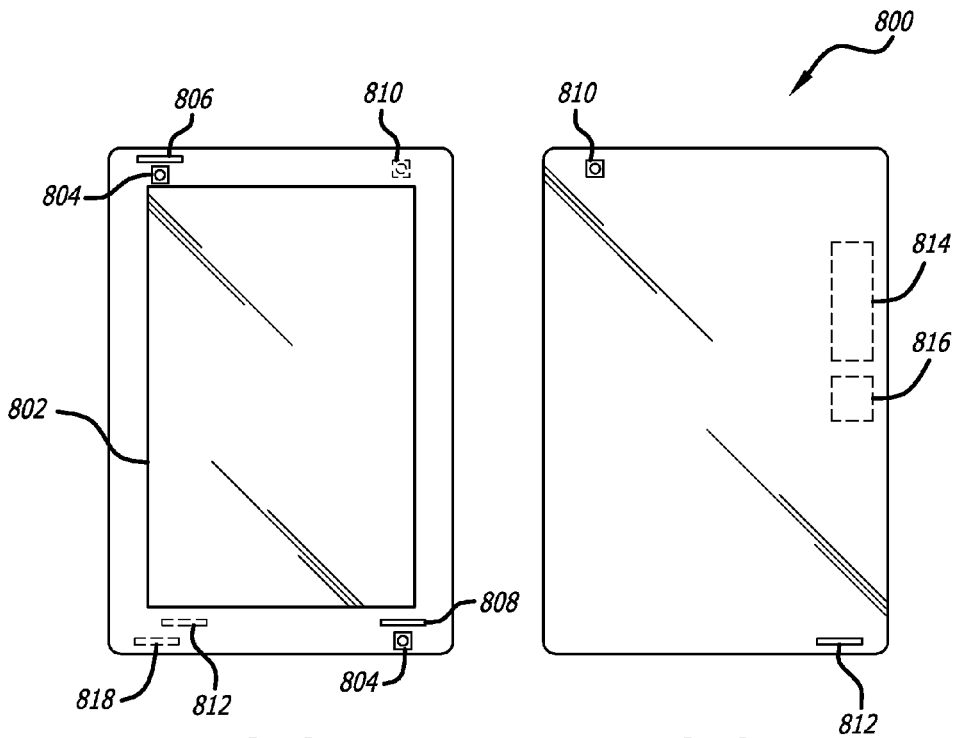
FIGS. 8A and 8B illustrate an example computing device that can be used to implement aspects of various embodiments.

FIGS. 8A and 8B illustrate front and back views, respectively, of an example computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
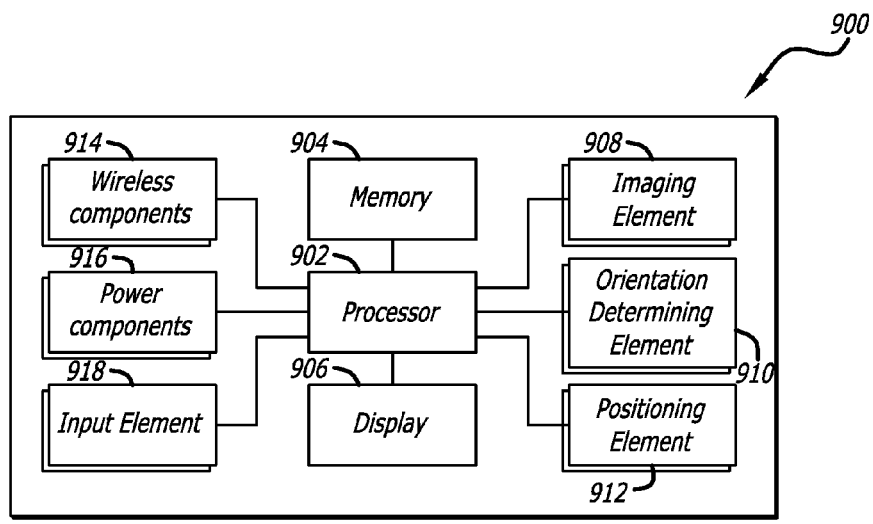
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
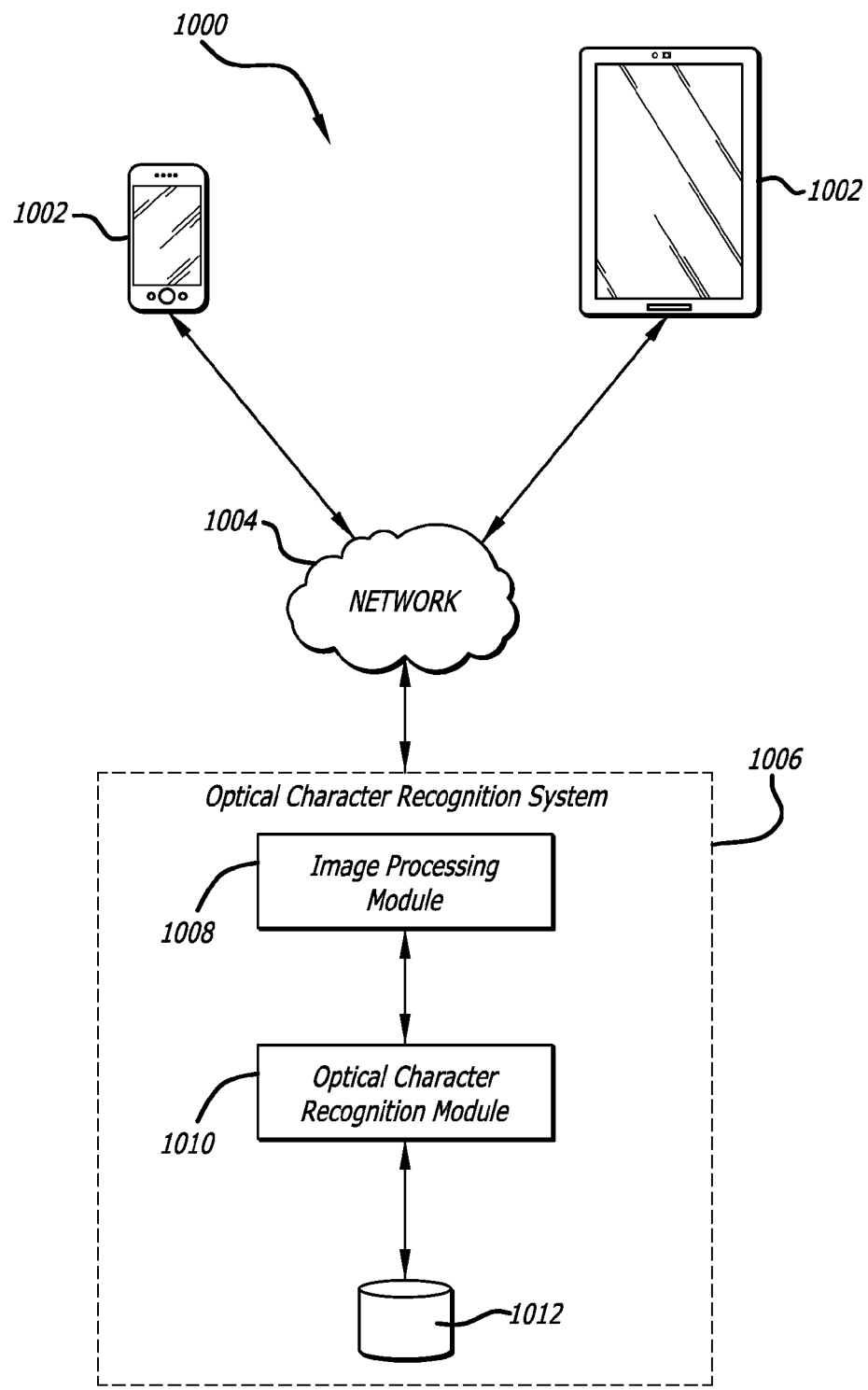
FIG. 10 illustrates an example environment in which various embodiments can be implemented.

FIG. 10 is an example environment 1000 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 1002, such as a personal computer, tablet computer, smart phone, and the like, to access an Optical Character Recognition system or service 1006 over at least one appropriate network 1004, such as a cellular network, the Internet, or another such network for communicating digital information. The client device 1002 can capture one or more images (or video) of text and send the images to the Optical Character Recognition system or service 1006 over the at least one appropriate network 1004. The Optical Character Recognition system 1006 includes an image-processing module 1008 that can apply different operators or techniques to pre-process the images before submitting the images to one or more optical character recognition modules 1010. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 1010 concurrently recognizes text from the image to produce multiple recognized text outputs. In at least one embodiment, a processor can analyze the recognized text using a database 1012 of words in order to improve the recognition. The database 1012 includes a set of words which the processor can search for matches corresponding to words present in the recognized text. At least a portion of these tasks can be performed on a portable computing device or by using at least one resource available across a network as well. In at least some embodiments, an OCR application will be installed on the client device 1002, such that much of the processing, analyzing, or other such aspects can be executed on the client device. Various processing steps can be performed by the client device 1002, by the Optical Character Recognition system 1006, or a combination thereof. Therefore, it should be understood that the components and capabilities of the Optical Character Recognition system 1006 could wholly or partly reside on the client device 1002.

Figure 11:
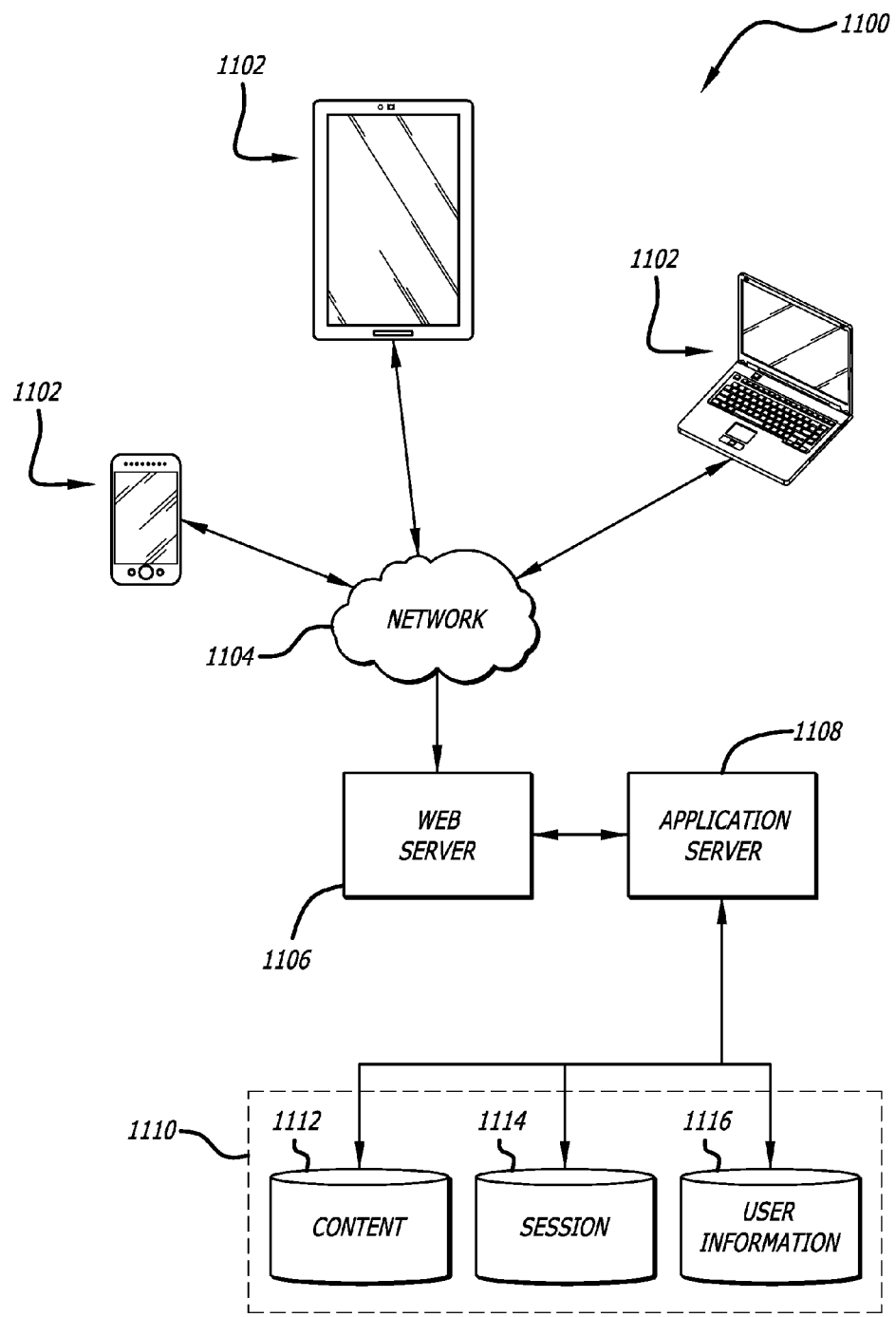
FIG. 11 illustrates another environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
  displaying an image, captured by a camera of a computing device, on a display element of the computing device;
  analyzing the image to locate a region of text in the image;
  recognizing text within the region with an optical character recognition (OCR) engine, the OCR engine providing an output of recognized text including characters grouped by one or more text lines;
  analyzing the one or more text lines to isolate a character string indicative of at least one of a phone number, an email address, or a uniform resource locator (URL), each character of the isolated character string being assigned to a character class to produce a character class string;

based at least in part on a pattern of the character class string, determining a matching score for the isolated character string with respect to at least one of a phone number, an email address, or a URL, the isolated character string being identified as the at least one of a phone number, an email address, or a URL if the matching score is greater than a threshold score, wherein determining the matching store comprises assigning costs to edits made to the character class string, wherein a cost associated with mistaking characters that are similar in appearance is small and the cost associated with mistaking characters that are relatively different in appearance is greater than a threshold value;

determining an overlay template and respective functionality for the at least one of a phone number, an email address, or a URL; and displaying the isolated character string on the display element using the overlay template as an overlay element in a live field of view being captured by the camera, the overlay element including at least one user-selectable element enabling the respective functionality associated with the at least one of a phone number, an email address, or a URL to be performed.

2. The computer-implemented method of claim 1, wherein various costs to various edits are provided in an N by M matrix where N represents a number possible ASCII characters and M represents a number of possible character classes.

3. The computer-implemented method of claim 1, wherein analyzing the one or more text lines to isolate groups of characters includes omitting groups of characters that do not fit a pattern indicative of at least one of the phone number, the email address, or the URL.

4. The computer-implemented method of claim 1, further comprising:
validating the isolated character string by comparing the isolated character string to a determined number of most popular URLs in response to the pattern of the character string being indicative of a URL.

5. A computer-implemented method, comprising:
receiving an output from an optical character recognition (OCR) engine;
analyzing the output to isolate a character string indicative of a text entity;
assigning each character of the isolated character string to a character class to produce a character class string; and
based at least in part on a pattern identified for the character class string, identifying the isolated character string as being the text entity, wherein the isolated character string is identified as the text entity in response to determining a matching score above a threshold for the isolated character string, the matching score being based at least in part on a number of edits made to the character class string, and wherein determining the matching store comprises assigning costs to edits made to the character class string, wherein a cost associated with mistaking characters that are similar in appearance is small and the cost associated with mistaking characters that are relatively different in appearance is greater than a threshold value.

6. The computer-implemented method of claim 5, wherein analyzing the output to isolate the character string indicative of the text entity includes performing one or more heuristic tests.

7. The computer-implemented method of claim 6, further comprising:
converting the output into text lines; and
omitting characters that do not fit a pattern indicative of the text entity.

8. The computer-implemented method of claim 5, wherein various costs to various edits are provided in an N by M matrix where N represents a number possible ASCII characters and M represents a number of possible character classes.

9. The computer-implemented method of claim 5, further comprising:
autocorrecting a character in the character string to a character of a character class associated with the text entity in response to identifying the character belonging to a character class not associated with the text entity type.

10. The computer-implemented method of claim 5, further comprising:
validating the isolated character string by comparing the isolated character string to a determined number of most popular URLs in response to the pattern of the character string being indicative of a URL.

11. The computer-implemented method of claim 5, further comprising:
validating the isolated character string by comparing the isolated character string to valid area codes in response to the pattern of the character string being indicative of a phone number.

12. A computing device, comprising:
a processor;
a display screen; and
memory including instructions that, when executed by the processor, cause the computing device to:
receive an output from an optical character recognition (OCR) engine;
analyze the output to isolate a character string indicative of a text entity;
assign each character of the isolated character string to a character class to produce a character class string; and
based at least in part on a pattern of the character class string, identify the isolated character string as being the text entity, wherein the isolated character string is identified as the text entity in response to determining a matching score above a threshold for the isolated character string, the matching score being based at least in part on a number of edits made to the character class string, and wherein determining the matching store comprises assigning costs to edits made to the character class string, wherein a cost associated with mistaking characters that are similar in appearance is small and the cost associated with mistaking characters that are relatively different in appearance is greater than a threshold value.

13. The computing device of claim 12, wherein analyzing the output to isolate the character string indicative of the text entity includes performing one or more heuristic tests.

14. The computing device of claim 13, wherein the instructions, when executed by the processor, further enable the computing device to:
convert the output into text lines; and
omit characters that do not fit a pattern indicative of the text entity.

15. A non-transitory computer-readable storage medium storing instructions that, when executed by at least one processor, cause a computing device to:
receive an output from an optical character recognition (OCR) engine;

analyze the output to isolate a character string indicative of a text entity;

assign each character of the isolated character string to a character class to produce a character class string; and based at least in part on a pattern of the character class string, identify the isolated character string as being the text entity, wherein the isolated character string is identified as the text entity in response to determining a matching score above a threshold for the isolated character string, the matching score being based at least in part on a number of edits made to the character class string, and wherein determining the matching store comprises assigning costs to edits made to the character class string, wherein a cost associated with mistaking characters that are similar in appearance is small and the cost associated with mistaking characters that are relatively different in appearance is greater than a threshold value.

16. The non-transitory computer-readable storage medium of claim 15, wherein various costs to various edits are provided in an N by M matrix where N represents a number possible ASCII characters and M represents a number of possible character classes.

17. The non-transitory computer-readable storage medium of claim 15, wherein the instructions that, when executed by the at least one processor, further cause the computing device to:

autocorrecting a character in the character string to a character of a character class associated with the text entity in response to identifying the character belonging to a character class not associated with the text entity type.

18. The non-transitory computer-readable storage medium of claim 15, wherein the instructions that, when executed by the at least one processor, further cause the computing device to:

validating the isolated character string by comparing the isolated character string to a determined number of most popular URLs in response to the pattern of the character string being indicative of a URL.

\* \* \* \* \*